(12) United States Patent
Abbott, Jr. et al.

(10) Patent No.: US 11,633,915 B2
(45) Date of Patent: Apr. 25, 2023

(54) REMOVABLE CASSETTE FOR 3D PRINTERS

(71) Applicant: HEWLETT-PACKARD DEVELOPMENT COMPANY, L.P., Spring, TX (US)

(72) Inventors: James Elmer Abbott, Jr., Corvallis, OR (US); David A. Champion, Corvallis, OR (US); Chris Paul Schodin, San Diego, CA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 346 days.

(21) Appl. No.: 17/107,486

(22) Filed: Nov. 30, 2020

(65) Prior Publication Data

US 2021/0078249 A1   Mar. 18, 2021

Related U.S. Application Data

(63) Continuation of application No. 15/757,283, filed as application No. PCT/US2015/066871 on Dec. 18, 2015, now Pat. No. 10,882,253.

(51) Int. Cl.
| | |
|---|---|
| *B29C 64/245* | (2017.01) |
| *B33Y 30/00* | (2015.01) |
| *B33Y 50/02* | (2015.01) |
| *B33Y 10/00* | (2015.01) |
| *B33Y 40/00* | (2020.01) |

(Continued)

(52) U.S. Cl.
CPC .......... *B29C 64/245* (2017.08); *B29C 64/112* (2017.08); *B29C 64/165* (2017.08); *B29C 64/291* (2017.08); *B29C 64/393* (2017.08); *B33Y 10/00* (2014.12); *B33Y 30/00* (2014.12);

(Continued)

(58) Field of Classification Search
CPC ...... B29C 64/245; B29C 64/25; B29C 64/259
See application file for complete search history.

(56) References Cited

U.S. PATENT DOCUMENTS

| | | |
|---|---|---|
| 6,042,774 A | 3/2000 | Wilkening |
| 7,708,929 B2 | 5/2010 | Monsheimer |

(Continued)

FOREIGN PATENT DOCUMENTS

| | | |
|---|---|---|
| JP | H04-329119 | 11/1992 |
| JP | 2013-067036 | 4/2013 |

(Continued)

OTHER PUBLICATIONS

"Three-Dimensional Additive Manufacturing Using Microwaves"; Aug. 9, 2007; http://www.me.mtu.edu/~rmdsouza/3D_RP.html.

*Primary Examiner* — Kelly M Gambetta
*Assistant Examiner* — Virak Nguon
(74) *Attorney, Agent, or Firm* — Shook, Hardy & Bacon L.L.P.

(57) ABSTRACT

In example implementations, an apparatus includes a housing, a movable base, a tab portion and a coupling mechanism. The housing is comprised of a microwave transparent material. The movable base is coupled to the housing to receive build material that is digitally printed. The tab portion is coupled to a bottom portion of at least one wall of the housing. The tab portion stops the movable base. The coupling mechanism is coupled to the housing to removably attach the apparatus to a three dimensional printer.

20 Claims, 5 Drawing Sheets

(51) Int. Cl.
*B29C 64/165* (2017.01)
*B29C 64/112* (2017.01)
*B29C 64/393* (2017.01)
*B29C 64/291* (2017.01)

(52) U.S. Cl.
CPC .............. *B33Y 40/00* (2014.12); *B33Y 50/02* (2014.12); *B29K 2995/0027* (2013.01)

(56) References Cited

U.S. PATENT DOCUMENTS

| | | | |
|---|---|---|---|
| 2004/0232583 A1* | 11/2004 | Monsheimer | B33Y 30/00 425/375 |
| 2007/0087071 A1* | 4/2007 | Devos | B29C 64/165 425/375 |
| 2007/0241482 A1 | 10/2007 | Giller | |
| 2010/0101490 A1 | 4/2010 | Bokodi | |
| 2011/0223349 A1 | 9/2011 | Scott | |
| 2011/0252618 A1 | 10/2011 | Diekmann | |
| 2012/0291701 A1 | 11/2012 | Grasegger | |
| 2015/0054204 A1 | 2/2015 | Tseliakhovich | |
| 2015/0084240 A1 | 3/2015 | Shuck | |
| 2015/0202687 A1 | 7/2015 | Pialot | |
| 2016/0366728 A1 | 12/2016 | Folgar | |
| 2018/0133800 A1 | 5/2018 | Pieger | |

FOREIGN PATENT DOCUMENTS

| | | |
|---|---|---|
| WO | WO-2005-076799 | 8/2005 |
| WO | WO-2014197086 | 12/2014 |

\* cited by examiner

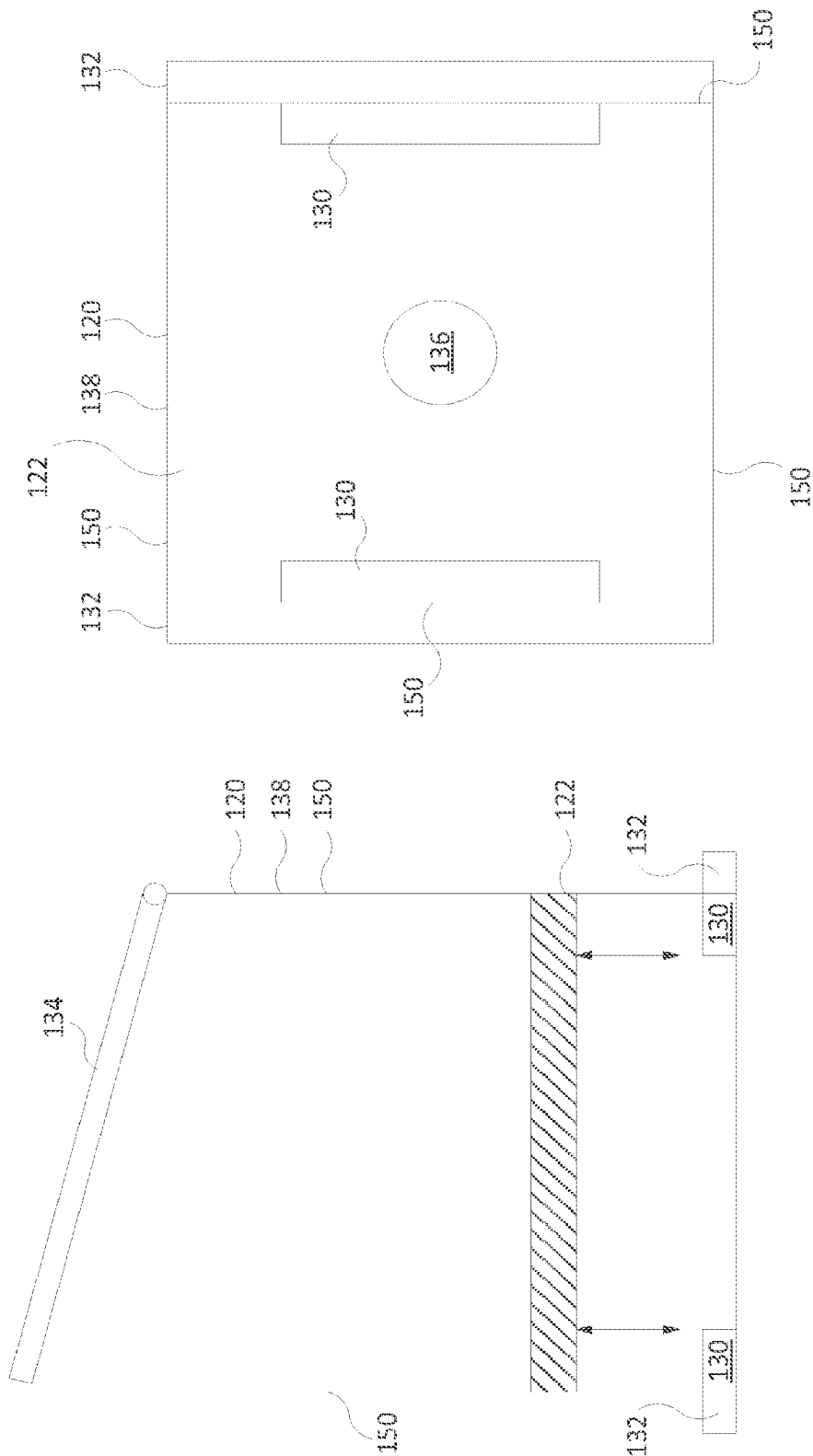

REMOVABLE CASSETTE FOR 3D PRINTERS

BACKGROUND

Three dimensional (3D) printers are becoming more ubiquitous as costs for the printers come down. 3D printers, also referred to as additive manufacturing machines, typically operate by using a material to generate a 3D object layer-by-layer. In some systems, a three dimensional computer aided drawing (CAD) model may be created. Then, an object may be generated in accordance with the model. Example materials may include polymers, metals, or plastic.

BRIEF DESCRIPTION OF THE DRAWINGS

FIG. 2 is an example of a cross-sectional side view of a removable cassette of the present disclosure;

FIG. 3 is an example bottom view of the removable cassette of the present disclosure;

DETAILED DESCRIPTION

The present disclosure discloses an apparatus and method for using a removable cassette for 3D printing. The removable cassette may be attached to a 3D printer. Layers of build material may be dispensed onto a movable base plate. In the present example, portions of each layer of build material may be digitally printed with a liquid functional material within the removable cassette. The liquid functional material "outlines" the portions of each layer that will form the three dimensional object after the build material is fused. Notably, in the present disclosure, each layer is not cured or fused after application of the liquid functional material to portions of each layer of the build material.

Rather, after portions of each layer of build material are digitally printed, the removable cassette may be covered with a lid and moved to a furnace to fuse the digitally printed portions of each layer of build material. In other words, the fusing of digitally printed layers of the build material occurs in the furnace, rather than within the 3D printer as with some other 3D printing techniques.

In contrast, a typical 3D printing process heats and fuses each layer as each layer is being printed or immediately after each printing pass of a layer. By eliminating the heating process during or after each layer is printed, the efficiency of the 3D printing process and uniformity of material properties may be improved. Rather, the present disclosure allows layers of build material that are digitally printed, but unbound, to be placed into the removable cassette and placed into a furnace (e.g., a microwave furnace, a furnace, a fusing chamber exposing the objects to electromagnetic radiation outside the range designated as microwave radiation). The furnace provides heat or energy that fuses the portions of the build material that received the liquid functional material to each other and between layers of the build material that received the liquid functional material. The portions of each layer of the layers of build material that are digitally printed with the liquid functional material may be fused simultaneously, or at the same time, within the removable cassette in a single step.

Figure 1:
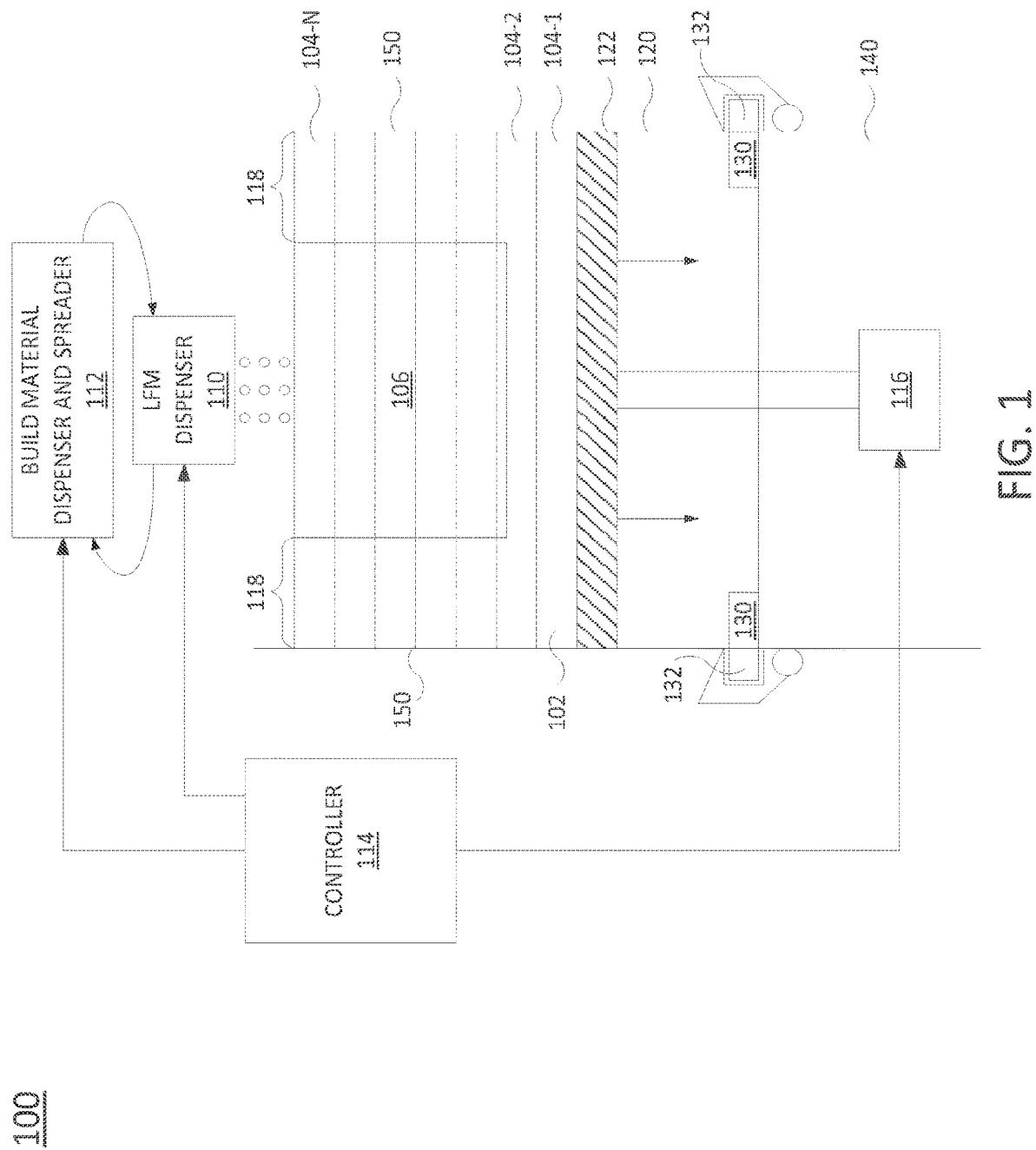
FIG. 1 is a block diagram of an example apparatus of the present disclosure.

FIG. 1 illustrates a block diagram of an example 3D printer 100 of the present disclosure. In one example, the 3D printer 100 may include a removable cassette 120, a liquid functional material (LFM) dispenser 110 and a build material dispenser and spreader 112. In one implementation, a movable base 122 of the removable cassette may be coupled to a motor 116 to move the movable base 122 up and down.

In one implementation, a controller 114 may be in communication with the LFM dispenser 110, the build material dispenser and spreader 112 and the motor 116. The controller 114 may control the build material dispenser and spreader 112 to dispense layers 104-1 to 104-N (herein referred to individually as a layer 104 or collectively as layers 104) of a build material 102. The controller 114 may control the LFM dispenser 110 to dispense LFM on portions of each layer 104 of build material 102. The controller 114 may control the motor 116 to move the movable base 122 lower after each layer 104 is provided and digitally printed by the LFM to receive an additional layer 104 of build material 102.

In one example, the movable base 122 may be coupled to the motor 116 via an interface. For example, the interface may be a mechanical connection. For example, the movable base 122 may be coupled to the interface that comprises a lead screw that is connected to the motor 116. The motor 116 may be a stepper motor that moves the lead screw in defined increments. The movement of the movable base 122 in a downward direction may be referred to as indexing down and the movement of the movable base 122 in an upward direction may be referred to as indexing up.

In one example, a structure 106 may be designed using, for example, a computer aided design (CAD) program and uploaded to the controller 114. In some implementations, bitmap slices of each layer or raster slices of each layer of a design of the structure 106 may be uploaded to the controller 114. The controller 114 may then control the LFM dispenser 110, the build material dispenser and spreader 112 and the motor 116 to digitally print the structure 106 in the layers 104 of the build material 102 without applying energy between each one of the layers 104 of build material 102 that is dispensed.

In one implementation, the build material 102 may be a microwave transparent material. The microwave transparent material may be any type of granular material including a powder, a gel, a slurry, and the like, that is predominately microwave transparent. The granular material may have an average diameter of approximately 3-30 microns (μm). For slurries and gels, the average diameter may be as small as 1 nanometer (nm). Examples of microwave transparent materials that can be used as the build material 102 may include alumina ($Al_2O_3$), silicon nitride (SiN), a ceramic, a glass ceramic, a glass, polytetrafluoroethylene (PTFE), zirconium dioxide ($ZrO_2$), silicon dioxide ($SiO_2$), yttrium oxide ($Y_2O_3$), magnesium oxide (MgO), aluminum oxide ($Al_2O_3$), boron nitride (BN), calcium fluoride ($CaF_2$), tantalum pentoxide ($Ta_2O_5$), niobium pentoxide ($Nb_2O_5$), titanium oxide ($TiO_2$), quartz, fused silica, mullite, and the like.

A layer 104 of the build material 102 may be dispensed onto the movable base 122 and rolled to be level, or even, by the build material dispenser and spreader 112. Based on the structure 106, the controller 114 may dispense LFM onto portions of the layer 104 of build material 102. The LFM may be a susceptor that absorbs microwave energy selectively better than the build material 102. The LFM may also be a material designed to decrease the local fusing temperature or otherwise locally modify the material properties of the digitally defined object. The layer 104 of the build material 102 is digitally printed by applying the LFM to the portions of the layer 104 of the build material 102 to create a susceptor pattern that corresponds to a respective layer of the structure 106. The LFMs may also be used to modify the local electrical or other fundamental properties of the build material 102 to create a benefit to the final structure 106.

It should be noted that the LFM is not a binder by itself and does not bind the particles of the build material 102 without application of energy. In other words, the LFM alone does not bind the particles of the build material 102. Rather an energy is applied to the LFM in a furnace, as described below to bind the build material 102.

An example of the LFM may include any type of material that is conducting, semi-conducting or have a magnetic dipole that can be used as microwave, or radio frequency (RF) susceptors at ambient temperature. Some examples may include carbon black, graphite, carbon nano tubes, silicon carbide (SiC), zinc oxide (ZnO), indium tin oxide (ITO), titanium nitride (TiN), ferrite inks, ferromagnetic materials, ferroelectric materials, and the like.

In addition, the LFMs may include materials designed to react with a base material to enable fusing with less fusing energy delivered. This may include silicon oxide ($SiO_2$) nano-particles, combinations of oxides to form glass in the interstitial regions between particles, and the like.

The dispensing of the build material 102 and the digital printing of portions of the layer 104 of the build material 102 may be repeated until the entire structure 106 is digitally printed within a plurality of layers 104-N of the build material 102. Notably, each layer 104 of the build material 102 is not heated or fused. Rather, the layers 104-1 to 104-N of the build material 102 remain loose, unbound or uncured.

In one implementation, additional layers 104 that are free from the LFM may be dispensed as a bottom most layer and a top most layer to provide insulation. In addition, the structure 106 may be digitally printed within each layer 104 of the build material 102 at a minimum distance 118 from walls 150 of the removable cassette 120 to provide an insulation layer. In one implementation, the minimum distance 118 may be approximately greater than or equal to 10 millimeters (mm).

As discussed below, the layers 104-1 to 104-N of the build material 102 may be inserted into the removable cassette 120. The removable cassette 120 can be removed from the 3D printer 100 and inserted into a furnace (e.g., a microwave furnace, a furnace, a fusing chamber exposing the objects to electromagnetic radiation outside the range designated as microwave radiation) to fuse the digitally printed portions of each layer 104-1 to 104-N at the same time.

In one implementation, the removable cassette 120 may include at least one tab portion 130. The tab portion 130 may be any shape and located near a bottom edge of the removable cassette 120. The tab portion 130 may provide a stopping location for the movable base 122. The tab portion 130 may be integrally formed as part of the removable cassette 120 (e.g., the tab portion 130 and the removable cassette 120 are a single unitary piece). Alternatively, the tab portion 130 may be separately coupled to the removable cassette 120 as a separate piece.

In one implementation, the removable cassette 120 may also include at least one mechanical feature 132 to couple the removable cassette 120 to the 3D printer 100. For example, a platform or a bed 140 of the 3D printer 100 may include a fastener, a spring loaded clamp, a slot, and the like that can mate with, or lock onto, the mechanical feature 132 to hold the removable cassette 120 stable and in position while the layers 104 of the build material 102 are dispensed and the portions of the layers 104 of the build material 102 are digitally printed.

FIG. 2 illustrates an example cross-sectional side view of the removable cassette 120 that is insertable into the 3D printer 100. FIG. 2 illustrates the movable base 122, the tab portion 130 and the mechanical feature 132, as described above. In one example, the movable base 122 may be fabricated from a reflective metal or a microwave transparent material. For example, the movable base 122 may be a microwave transparent material when the removable cassette 120 is inserted into a completed microwave cavity. The movable base 122 may be made of, or may comprise, a reflective material when a base of the removable cassette 120 is designed to be an active part of the microwave cavity.

In one implementation, the movable base 122 may fit within a housing 138 formed by walls 150 such that the build material 102 does not leak or fall out of the movable base 122. In other words, the movable base 122 may be sealed or tightly fit within the walls 150 of the housing 138 such that the build material 102 does not leak out between the movable base 122 and the walls 150.

In one implementation, the removable cassette 120 may also include a movable lid 134. The movable lid 134 may be in an open position during dispensing of the build material 102 into the removable cassette 102 and in a closed position during transportation of the layers 104 of the build material 102.

In one example, the walls 150 of the housing 138 and the movable lid 134 may be fabricated from a microwave transparent material. As discussed above, examples of microwave transparent materials may include alumina ($Al_2O_3$), silicon nitride (SiN), a ceramic, a glass ceramic, a glass, polytetrafluoroethylene (PTFE), zirconium dioxide ($ZrO_2$), silicon dioxide ($SiO_2$), yttrium oxide ($Y_2O_3$), magnesium oxide (MgO), aluminum oxide ($Al_2O_3$), boron nitride (BN), calcium fluoride ($CaF_2$), tantalum pentoxide ($Ta_2O_5$), niobium pentoxide ($Nb_2O_5$), titanium oxide ($TiO_2$), quartz, fused silica, mullite, and the like.

FIG. 3 illustrates an example bottom view of the removable cassette 120. The movable base 122 may include an opening 136. The opening 136 may be threaded or smooth to connect to a mechanical device of the 3D printer 100 to move the movable base 122. For example, as described above, the mechanical device may be a lead screw that is connected to the opening 136 and coupled to the motor 116.

The bottom view in FIG. 3 illustrates the four walls 150 of the housing 138 in a square or a rectangular shape. However, it should be noted that the removable cassette 120 may have any shape for a particular application.

FIG. 3 illustrates an example of the tab portions 130 as being a rectangular shape on opposite sides of a bottom portion of the housing 138. However, it should be noted that the tab portions 130 may be any size or any number. For example, the tab portions 130 may be smaller squares located in each corner of the housing 138, may be smaller squares located in the middle bottom edge of each wall 150, and the like.

FIG. 3 also illustrates an example of the mechanical feature 132. Although the mechanical feature 132 is illustrated on two opposite walls 150, it should be noted that the mechanical feature 132 may be located on wall 150. In addition, the removable cassette 120 may have any number of mechanical features 132. Furthermore, although the mechanical feature 132 is illustrated as running along an entire width of the wall 150, it should be noted that the mechanical feature 132 may be smaller and located anywhere along the width of the wall 150.

Figure 4:
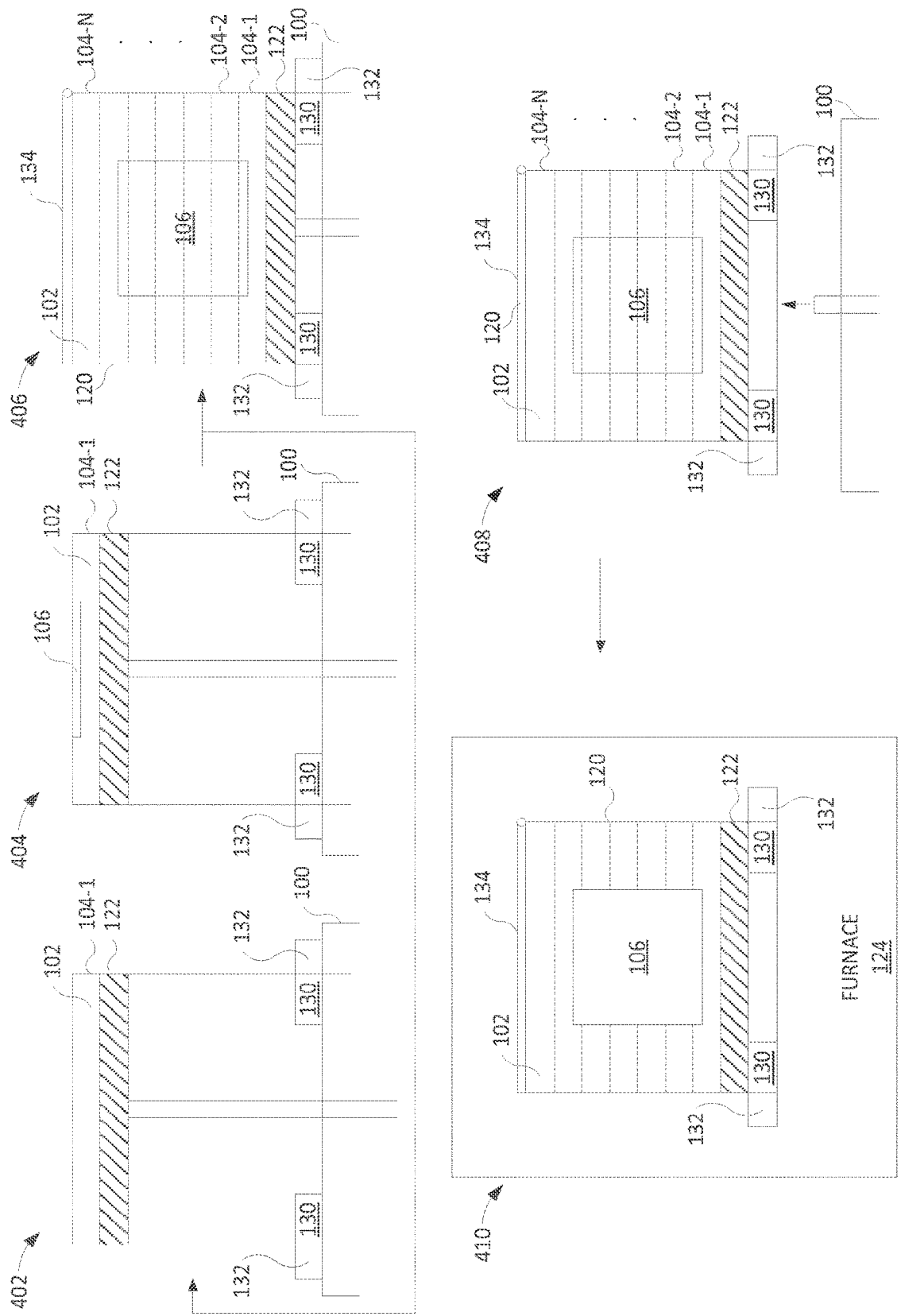
FIG. 4 is an example schematic flow diagram of the present disclosure.

FIG. 4 illustrates an example schematic flow diagram of a method for using a removable cassette for 3D printing. At block 402, a layer 104-1 of build material 102 may be dispensed onto the movable base 122 of the removable cassette 120. The removable cassette 120 may be removably coupled to the 3D printer 100 via the mechanical features 132.

At block 404, the LFM may be dispensed onto selective portions of the layer 104-1 of the build material 102. After the LFM is dispensed, the movable base 122 may be indexed down and return to block 402 to receive another layer 104-2 of building material 102. The blocks 402 and 404 may be repeated until an entire structure 106 is digitally printed into layers 104-1 to 104-N of the build material 102 as shown in block 406.

After the structure 106 is defined by the digitally printed portions of the layers 104 of build material 102, the movable lid 134 may be moved into a closed position. After the movable lid 134 is closed, the layers 104 of build material 102 may be secured in the removable cassette 120 and safely transported.

In one implementation, a filler material may also be inserted into the selected portions of the layer 104-1 of the build material 102. The filler material may be used to increase the density of the build material 102 or to help drive the fusing process (discussed below). Examples of filler material that may be used may include nano-particles of ceramics, Sol-Gel, and the like.

At block 408, the removable cassette 120 may be removed from the 3D printer 100. The removable cassette 120 may be designed to ensure that the layers 104-1 to 104-N remain stable inside the removable cassette 120. As noted above, each layer 104-1 to 104-N is not fused after portions of each layer 104 are digitally printed. Said another way, the layers 104-1 to 104-N remain unbound, unfused, or uncured when transported in the removable cassette 120.

At block 410, the removable cassette 120 may be inserted into a furnace 124. The furnace 124 may be a microwave furnace. The furnace may fuse the portions of each layer 104 that were digitally printed with the LFM at the same time. As noted above, the LFM may be a susceptor that absorbs microwave energy selectively better than the surrounding build material 102 that does not receive the LFM. As a result, the defined structure 106 may be fused as illustrated in block 410 without the dashed lines of each layer 104. In one example, the excess build material 102 that is not fused may be removed and recycled. The removable cassette 120 may also be reused.

Figure 5:
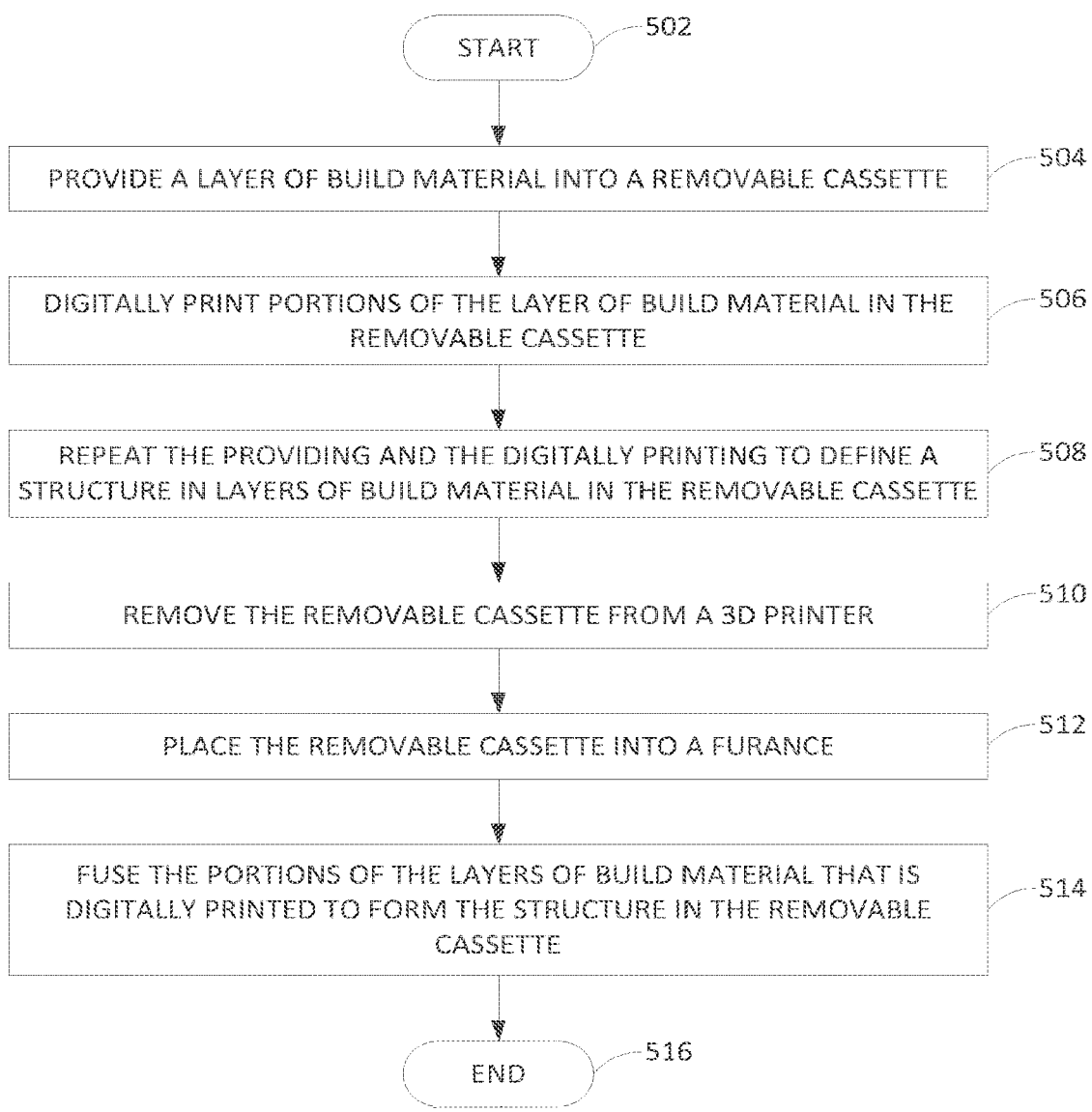
FIG. 5 is a flow diagram of an example method for using a removable cassette for 3D printing.

FIG. 5 illustrates a flow diagram of an example method 500 for using a removable cassette for 3D printing. In one example, the blocks of the method 500 may be performed by the controller 114 or using the 3D printer 100.

At block 502, the method 500 begins. At block 504, the method 500 provides a layer of build material into a removable cassette. In one example, the build material may be a microwave transparent material. The microwave transparent material may be a powder that is microwave transparent. The particles of powder may have an average diameter of approximately 3-30 microns ($\mu$m). Examples of microwave transparent materials that can be used as the build material may include alumina, silicon nitride, a ceramic, a glass ceramic, a glass, polytetrafluoroethylene (PTFE), zirconium dioxide ($ZrO_2$), silicon dioxide ($SiO_2$), yttrium oxide ($Y_2O_3$), magnesium oxide (MgO), aluminum oxide ($Al_2O_3$), boron nitride (BN), calcium fluoride ($CaF_2$), tantalum pentoxide ($Ta_2O_5$), niobium pentoxide ($Nb_2O_5$), titanium oxide ($TiO_2$), quartz, fused silica, mullite, and the like.

The removable cassette may be coupled to a platform or a bed of the 3D printer via a mechanical feature of the removable cassette. A base plate of the removable cassette may be indexed up and down via a mechanical device. For example, a lead screw may be coupled to an opening on a bottom side of the base plate and the lead screw may be coupled to a stepper motor.

At block 506, the method 500 digitally prints a liquid functional material (LFM) on portions of the layer of build material in the removable cassette. For example, a LFM may be dispensed onto the portions of the layer of build material that will define a structure. The LFM may be a susceptor that absorbs microwave energy selectively better than the build material. The LFM may be applied to the portions of layer of build material to create a susceptor pattern that corresponds to a respective layer of the structure 106.

At block 508, the method 500 repeats the providing and the digitally printing without applying energy to the LFM to define a structure in layers of build material in the removable cassette. For example, the structure may be defined or digitally printed layer by layer. In other words, a layer of build material may be added, portions of the layer of build material may be digitally printed by applying the LFM to the select portions, another layer of build material may be added on top of the previous layer of build material, portions of the new layer of build material may be digitally printed, and so forth, until enough layers of build material are digitally printed to define the structure.

At block 510, the method 500 removes the removable cassette from a 3D printer. For example, a movable lid of the removable cassette may be moved to a closed position to seal the removable cassette. The mechanical features may be uncoupled from the platform or the bed of the 3D printer.

At block 512, the method 500 places the removable cassette containing the layers of the build material that are uncured into a furnace. Notably, the removable cassette may contain the layers of build material that are digitally printed, but unbound. In addition, the removable cassette may be designed to provide stable transportation of the layers of build material. In other words, the layers of the build material may not move significantly within the removable cassette during transportation.

At block 514, the method 500 fuses the portions of the layers of build material that are digitally printed to form the structure in the removable cassette. For example, the portions of the layers of build material that are digitally printed may be heated or fused simultaneously, or at the same time. In other words, rather than fusing portions of each layer of the build material after each pass, the present disclosure may fuse each layer of build material that is digitally printed simultaneously, or at the same time, inside the furnace and within the removable cassette. At block 516, the method 500 ends.

Figure 6:
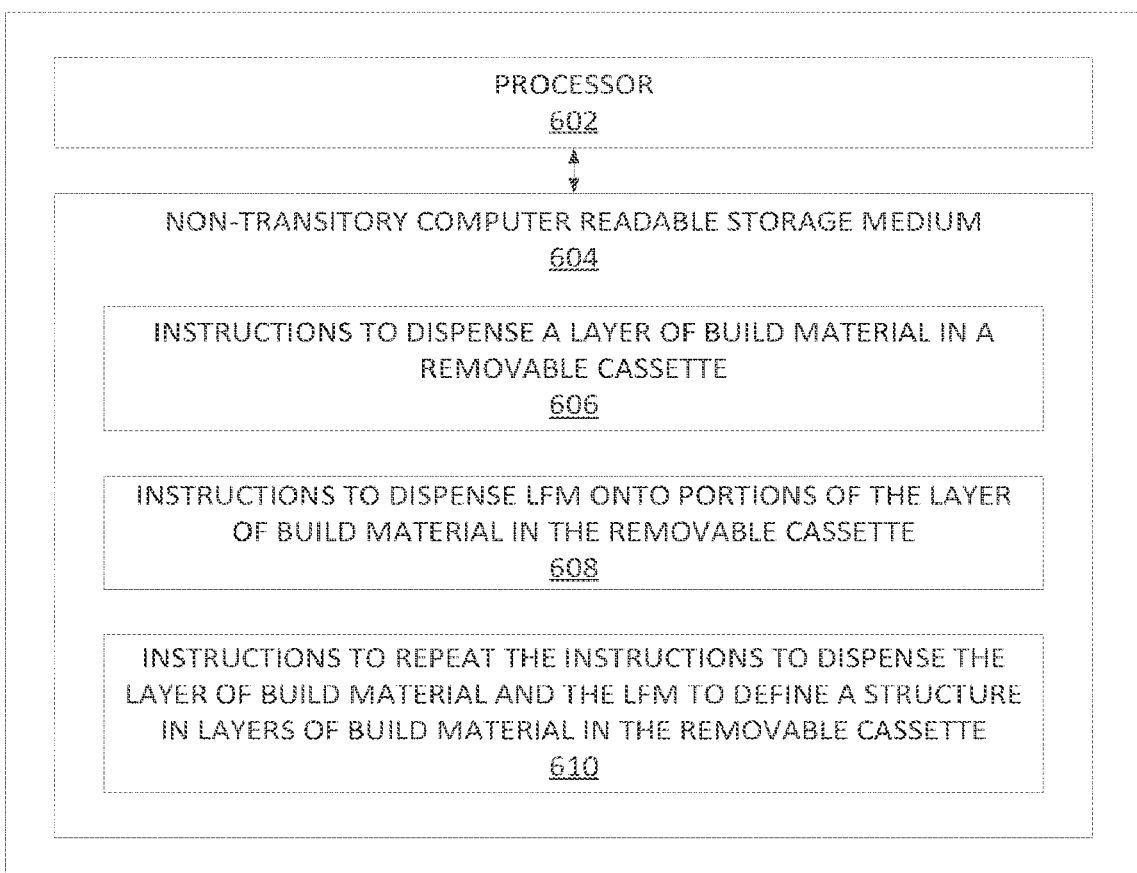
FIG. 6 is a block diagram of an example controller of the present disclosure.

FIG. 6 illustrates another example of an apparatus 600. In one example, the apparatus 600 may also be the controller 114. In one example, the apparatus 600 may include a processor 602 and a non-transitory computer readable storage medium 604. The non-transitory computer readable storage medium 604 may include instructions 606, 608 and 610 that when executed by the processor 602, cause the processor 602 to perform various functions.

In one example, the instructions 606 may include instructions to dispense a layer of build material in a removable cassette. The instructions 608 may include instructions to dispense LFM onto portions of the layer of build material in the removable cassette. The instructions 610 may include instructions to repeat the instructions to dispense the layer of build material and the LFM to define a structure in layers of build material in the removable cassette.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An additive manufacturing system, comprising:
    a three-dimensional printer comprising:
    a removable cassette to receive a number of stacked layers of build material;
    a build material dispenser and spreader to form each layer of build material in the removable cassette;
    a liquid functional material (LFM) dispenser to digitally print LFM on portions of each layer of build material in the removable cassette; and
    a controller programmed to control the build material dispenser and spreader and the LFM dispenser to repeatedly form layers of build material and digitally print LFM into portions of each layer without applying energy to the LFM to define a structure in layers of build material in the removable cassette; and
    a separate furnace to receive the removable cassette when the removable cassette is removed from the three-dimensional printer, the furnace for curing the portions of the layers of build material that are digitally printed with LFM to form a specified object in the removable cassette.

2. The system of claim 1, wherein the furnace comprises a heater to apply heat to cure the build material printed with LFM.

3. The system of claim 1, wherein:
    the removable cassette comprises a housing defining an interior space where an object is formed from the layers of build material, the housing being comprised of a microwave transparent material, the microwave transparent material arranged so as to admit microwave radiation from an exterior of the housing into the interior space where an object is formed; and
    the furnace is a microwave furnace.

4. The system of claim 1, wherein the removable cassette comprises:
    a movable base within a housing, the movable base to receive the layers of build material; and
    a tab portion coupled to a bottom portion of at least one wall of the housing, wherein the tab portion stops the movable base.

5. The system of claim 4, wherein the movable base indexes up and down within the housing, the movable base tightly abutting sidewalls of the housing with a sealed fit to prevent build material leaking between the movable base and sidewalls of the housing.

6. The system of claim 4, wherein the movable base comprises a reflective metal.

7. The system of claim 4, wherein the movable base comprises a microwave transparent material.

8. The system of claim 7, wherein the microwave transparent material comprises at least one of: alumina ($Al_2O_3$), silicon nitride (SiN), a ceramic, a glass ceramic, a glass, zirconium dioxide ($ZrO_2$), silicon dioxide ($SiO_2$), yttrium oxide ($Y_2O_3$), magnesium oxide (MgO), aluminum oxide ($Al_2O_3$), boron nitride (BN), calcium fluoride ($CaF_2$), tantalum pentoxide ($Ta_2O_5$), niobium pentoxide ($Nb_2O_5$), titanium oxide ($TiO_2$), quartz, fused silica or mullite.

9. The system of claim 1, wherein the removable cassette comprises:
    a housing defining an interior space where an object is formed from the layers of build material; and
    a coupling mechanism coupled to the housing to removably attach the removable cassette to the three-dimensional printer.

10. The system of claim 9, comprising:
    a movable lid coupled with a hinge to a top portion of the housing so as to pivot about the hinge to cover the layers of build material in the housing after portions of each one of the layers of build material are digitally printed to define the specified object.

11. The system of claim 9, wherein the coupling mechanism comprises a rotating lead screw coupled to a stepper motor.

12. The system of claim 1, further comprising a supply of LFM for the LFM dispenser.

13. The system of claim 12, wherein the LFM lowers a local curing temperature of build material that receives the LFM to facilitate curing of the build material that has received the LFM when processed in the furnace.

14. The system of claim 12, wherein the LFM is a susceptor that absorbs radio frequency energy to cure build material in which the LFM has been applied.

15. The system of claim 1, wherein the controller operates the LFM dispenser so that build material at a bottom, sides and top of the removable cassette is not treated with the LFM to provide insulation around the specified object being formed in the layers of build material.

16. An additive manufacturing system, comprising:
    a three-dimensional printer comprising:
    a removable cassette to receive a number of stacked layers of build material;
    a build material dispenser and spreader to form each layer of build material in the removable cassette;
    a liquid functional material (LFM) dispenser to digitally print LFM on portions of each layer of build material in the removable cassette; and
    a controller programmed to control the build material dispenser and spreader and the LFM dispenser to repeatedly form a layer of build material and digitally print LFM into portions of that layer to form the number of stacked layers of build material, the controller to form the number of stacked layers without applying a curing energy to the LFM, wherein the three-dimensional printer lacks an energy source to cure build material that has received LFM; and
    a separate furnace to receive the removable cassette when the removable cassette is removed from the three-dimensional printer, the furnace to apply heat or energy to the stacked layers of build material for curing the portions of the layers of build material that are digitally printed with LFM to form a specified object in the removable cassette.

17. The system of claim 16, wherein the furnace comprises a heater to apply heat to cure the build material printed with LFM.

18. The system of claim 16, wherein the removable cassette comprises:

a movable base within a housing, the movable base to receive the layers of build material, wherein the movable base comprises a microwave transparent material or a reflective metal; and a tab portion coupled to a bottom portion of at least one wall of the housing, wherein the tab portion stops the movable base.

19. The system of claim 18, wherein the movable base comprises a reflective metal.

20. The system of claim 16, wherein the controller operates the LFM dispenser so that build material at a bottom, sides and top of the removable cassette is not treated with the LFM to provide insulation around the specified being formed in the layers of build material.

* * * * *